United States Patent
Inao et al.

(10) Patent No.: US 10,395,802 B2
(45) Date of Patent: Aug. 27, 2019

(54) WIRE HARNESS MANUFACTURING METHOD

(71) Applicant: YAZAKI CORPORATION, Tokyo (JP)

(72) Inventors: Shinichi Inao, Shizuoka (JP); Hideomi Adachi, Shizuoka (JP); Kenta Yanazawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 186 days.

(21) Appl. No.: 15/422,985

(22) Filed: Feb. 2, 2017

(65) Prior Publication Data
US 2017/0229216 A1 Aug. 10, 2017

(30) Foreign Application Priority Data

Feb. 5, 2016 (JP) .................................. 2016-020409

(51) Int. Cl.
*H01R 43/00* (2006.01)
*H01B 13/012* (2006.01)
(Continued)

(52) U.S. Cl.
CPC ....... *H01B 13/012* (2013.01); *B60R 16/0215* (2013.01); *H02G 3/0462* (2013.01)

(58) Field of Classification Search
CPC ...... H01B 13/012; H02G 3/0462; H02G 1/00; B60R 16/0215; Y10T 29/49117; Y10T 29/49194
(Continued)

(56) References Cited

U.S. PATENT DOCUMENTS 2,799,721 A * 7/1957 Floyd, Jr. ............... B21F 15/06
174/84 C
5,792,532 A * 8/1998 Pfleger ................... F16L 11/118
138/121
(Continued)

FOREIGN PATENT DOCUMENTS

CN 102136706 A 7/2011
CN 103079894 A 5/2013
(Continued)

OTHER PUBLICATIONS

Japanese Office Action for the related Japanese Patent Application No. 2016-020409 dated Apr. 24, 2018.
(Continued)

*Primary Examiner* — Donghai D Nguyen
(74) *Attorney, Agent, or Firm* — Kenealy Vaidya LLP (57) ABSTRACT

A wire harness manufacturing method includes a conduction path inserting step of inserting one or a plurality of conduction paths from one end of a resin-made tubular exterior member to the other end thereof, and an exterior member working step of performing post-working on one or a plurality of parts of the exterior member, after the conduction path inserting step. The exterior member working step includes forming a convex-shaped part when viewed from an inner surface side of the exterior member by performing the post-working using heat on an outer surface side of the exterior member. The convex-shaped part is a vibration suppressing part to reduce a play rate of the conduction path in the exterior member and suppress a vibration of the conduction path.

8 Claims, 6 Drawing Sheets

(51) Int. Cl.
*B60R 16/02* (2006.01)
*H02G 3/04* (2006.01)

(58) Field of Classification Search
USPC .......... 29/825, 868, 33 F; 174/84 C
See application file for complete search history.

(56) References Cited

U.S. PATENT DOCUMENTS

| | | | |
|---|---|---|---|
| 9,490,613 | B2* | 11/2016 | Kato .......... H02G 1/00 |
| 2011/0155458 | A1 | 6/2011 | Kato et al. |
| 2011/0297415 | A1 | 12/2011 | Katou et al. |
| 2013/0140054 | A1 | 6/2013 | Kato et al. |
| 2013/0277106 | A1 | 10/2013 | Toyama |
| 2016/0101747 | A1 | 4/2016 | Inao et al. |

FOREIGN PATENT DOCUMENTS

| | | |
|---|---|---|
| CN | 103298661 A | 9/2013 |
| JP | 2011-254614 A | 12/2011 |
| JP | 2012-045962 A | 3/2012 |
| JP | 2015-006049 A | 1/2015 |
| JP | 2015-6094 A | 1/2015 |

OTHER PUBLICATIONS

Japanese Office Action for the related Japanese Patent Application No. 2016-020409 dated Feb. 27, 2018.
Chinese Office Action for the related Chinese Patent Application No. 201710064329.8 dated Jun. 20, 2018.
Japanese Office Action for the related Japanese Patent Application No. 2016-020409 dated Nov. 6, 2018.
Decision to Decline the Amendment for the related Japanese Patent Application No. 2016-020409 dated Nov. 6, 2018.

* cited by examiner

WIRE HARNESS MANUFACTURING METHOD

CROSS REFERENCE TO RELATED APPLICATIONS

This application claims priority from Japanese Patent Application No. 2016-020409 filed on Feb. 5, 2016, the entire contents of which are incorporated herein by reference.

BACKGROUND OF THE INVENTION

Field of the Invention

The invention relates to a method for manufacturing a wire harness including a resin-made tubular exterior member and one or multiple conduction paths to be inserted into and protected by the exterior member.

Description of Related Art

In order to electrically connect apparatuses mounted on an automobile to each other, there is used a wire harness. The wire harness includes a tubular exterior member and one or multiple conduction paths to be stored in the exterior member. For example, a wire harness disclosed in the below-cited patent document 1 is arranged to pass through the vehicle under-floor of an automobile. The part of the wire harness corresponding to the vehicle under-floor is arranged straight. This type wire harness is formed long. Here, the below-cited patent 1 shows the following matter relating to the straight arranged part. That is, it shows that the conduction paths within the exterior member are caused to vibrate due to the vibrations of the automobile while running.

[Patent Document 1] JP-A-2011-254614

In the above conventional art, when the conduction paths within the exterior member are caused to vibrate due to the vibrations of the automobile while running, the coating of the conduction paths (in the case that the coating has a shield function, a braided wire or a metal foil existing on the outside of the conduction path) can be strongly butted against the tube inner surface of the exterior member into damage.

Here, it seems that the above problem can be solved by reducing the inside diameter of the exterior member or by providing an inclusion within the exterior member to thereby eliminate a clearance between the inner surface of the exterior member and conduction path. However, to reduce the inside diameter of the exterior member or to provide the inclusion makes difficult the operation to insert the conduction path into the exterior member. Also, when the conduction path is inserted forcedly, there is raised a problem that the coating of the conduction path can be worn.

SUMMARY

One or more embodiments provide a wire harness manufacturing method which, while paying attention to workability concerning the insertion of the conductive path, can suppress the vibrations of the conduction path within the exterior member.

one or more embodiments provide a wire harness manufacturing method. According to the wire harness manufacturing method, a wire harness is manufactured by:
a conduction path inserting step of inserting one or a plurality of conduction paths from one end of a resin-made tubular exterior member to the other end thereof; and
an exterior member working step of performing post-working on one or a plurality of parts of the exterior member, after the conduction path inserting step,
wherein the exterior member working step includes forming a convex-shaped part when viewed from an inner surface side of the exterior member by performing the post-working using heat on an outer surface side of the exterior member, and
wherein the convex-shaped part is a vibration suppressing part to reduce a play rate of the conduction path in the exterior member and suppress a vibration of the conduction path.

According to one or more embodiments, since there is employed the method for inserting the conduction path into the exterior member before performing working on the exterior member, the insertion of the conduction path can be carried out smoothly. Also, since there is employed the method which, after insertion of the conduction path, performs working on the exterior member to form the vibration suppressing part, for example, by forming the vibration suppressing part in a portion where the conduction path is easy to vibrate, the play rate of the conduction path in such vibration suppressing part formed portion can be reduced. Thus, relative vibration between the conduction path and exterior member can be suppressed.

Here, with respect to the formation of the vibration suppressing part, in this invention, there is employed the method for thermally working the resin material to form such vibration suppressing part; however, the vibration suppressing part can also be formed by press working a metal material. In this invention, while paying attention to easy formation of the vibration suppressing part (in order to form a convex-shaped portion in such a manner that the conduction path is not crushed but is prevented from playing, the method for thermally working the resin material is easier), and also while paying attention to the reduced weight and cost of the wire harness, the method for forming the vibration suppressing part of the resin material is employed. Also, with respect to the form of the exterior member, there may be employed only a straight tube or only a flexible tube (bellows tube), or, a combination of these tubes. That is, in this invention, the form of the exterior member is not limited. When the exterior member is formed in a shape having no body split, waterproof, dustproof and other properties can be secured, thereby naturally enabling elimination of ill influences on the conduction path side.

In accordance with one or more embodiments, the forming the convex-shaped part may include forming and arranging a plurality of the convex-shaped parts which are vibration suppressing parts, alternately in a zigzag manner along a tube axial direction of the exterior member, or, in a scattering manner in a spiral direction around a tube axis of the exterior member.

According to one or more embodiments, since, for suppression of the movement of the conduction path, the a plurality of suppressing parts are arranged alternately in a zigzag manner along the tube axial direction of the exterior member, or, are arranged scattered in the spiral direction around the tube axis of the exterior member, in comparison with, for example, a structure where a pair of vibration suppressing parts are arranged in a direction perpendicular to the tube axis of the exterior member, even when the exterior member receives an external force, it is made difficult to be bent or broken easily. That is, the lowered rigidity of the exterior member can be prevented (in other words, the rigidity of the exterior member can be secured sufficiently). Also, according to this invention, since the vibration suppressing parts are formed in the above arrangement, the state of the conduction path within the exterior member provides a meandering state, thereby making it difficult for the conduction path to shift in the tube axial direction of the exterior member.

In accordance with one or more embodiments, the forming the convex-shaped part may include forming a reinforcing rib extending in the tube axial direction of the exterior member.

According to one or more embodiments, since the vibration suppressing part having a reinforcing rib is formed, even when the exterior member receives an external force, it can be made difficult to be bent or broken easily. That is, the lowered rigidity of the exterior member can be prevented.

According to one or more embodiments, since there is employed the method which, after inserting the conduction path into the exterior member, forms the vibration suppressing part having a convex shape on the inside of the exterior member, there is provided an effect that, while paying attention to the workability of insertion of the conduction path, the vibration of the conduction path within the exterior member can be suppressed. Also, according to this invention, there is also provided an effect that, wear, damage and so on of the coating of the conduction path (when it has a shield function, a braid or a metal foil provided on the outside of the conduction path) can be prevented.

According to one or more embodiments, since the a plurality of vibration suppressing parts are arranged in a zigzag manner or in the spiral direction, there is provided an effect that the rigidity of the exterior member can be secured sufficiently. Also, there is provided an effect that the shifting movement of the conduction path in the tube axial direction of the exterior member can be made difficult to occur.

According to one or more embodiments, while suppressing the vibration of the conduction path, the rigidity of the exterior member can be secured sufficiently.

DETAILED DESCRIPTION

The wire harness is manufactured by a method including a conduction path inserting step and an exterior member working step. In the conduction path inserting step, one or multiple conduction paths are inserted from one end of a tubular exterior member toward the other end thereof. Also, in the exterior member working step, post-working is performed on one or multiple parts of the exterior member. Specifically, there is performed such post-working as to form a vibration suppressing part. The vibration suppressing part is formed by post-working the exterior member from the tube outer surface side thereof. The vibration suppressing part is formed in a convex-shaped part when viewed from the tube inner surface side. The vibration suppressing part is formed as a part to reduce the play rate of the conduction path in the exterior member to thereby suppress the vibrations thereof.

Embodiment 1

Figure 1A:
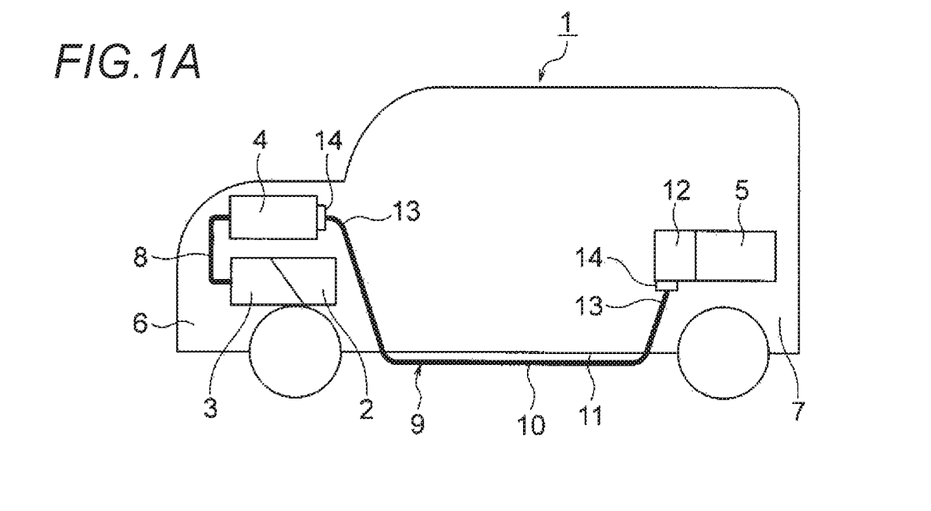
FIG. 1A is a schematic view of the arranged state of a high voltage wire harness.
Figure 1B:
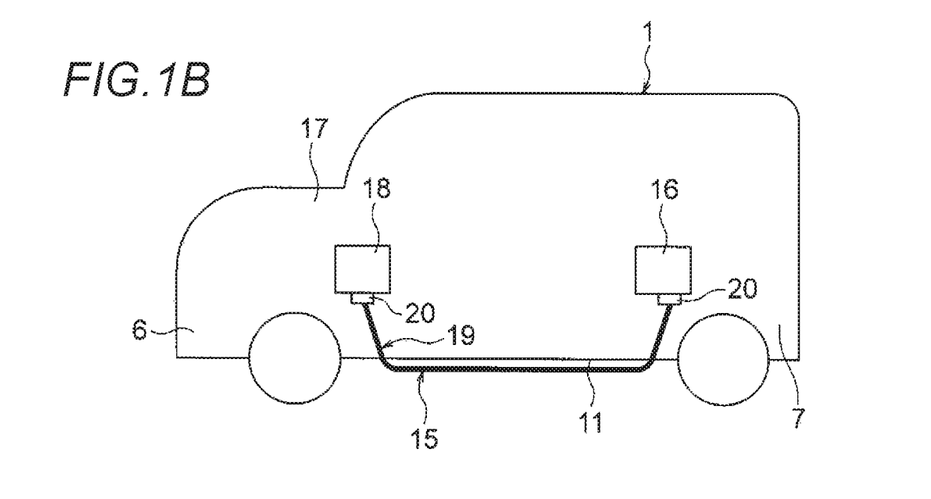
FIG. 1B is a schematic view of the arranged state of a low voltage wire harness different from one of FIG. 1A (embodiment 1).
Figure 2A:
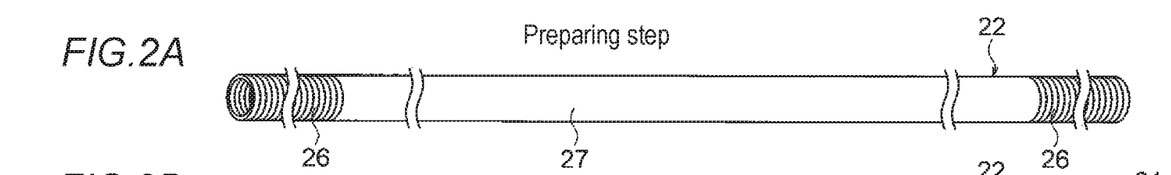
FIG. 2A is a perspective view of an exterior member.
Figure 2B:
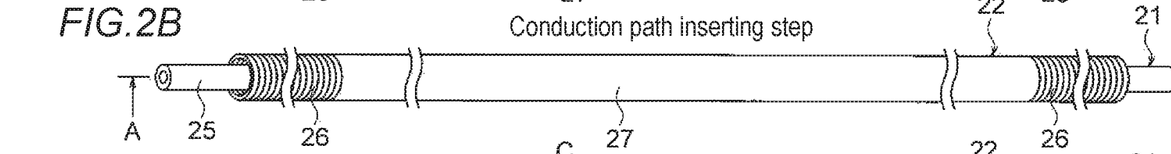
FIG. 2B is a view of a conduction path inserting step.
Figures 2C, 2D:
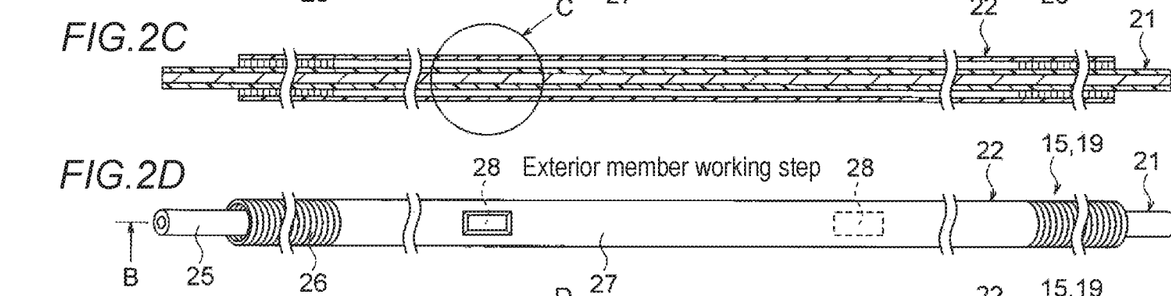
FIG. 2C is a section view taken along the A-A arrow line of FIG. 2B.
FIG. 2D is a view of an exterior member working step.
Figure 2E:
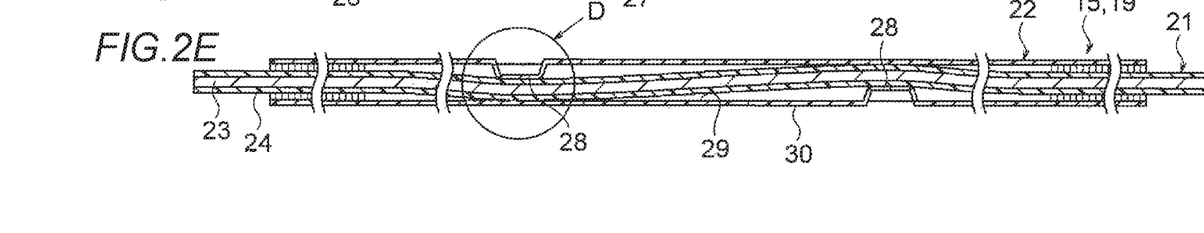
FIG. 2E is a section view taken along the B-B arrow line of FIG. 2D (embodiment 1).
Figure 3A:
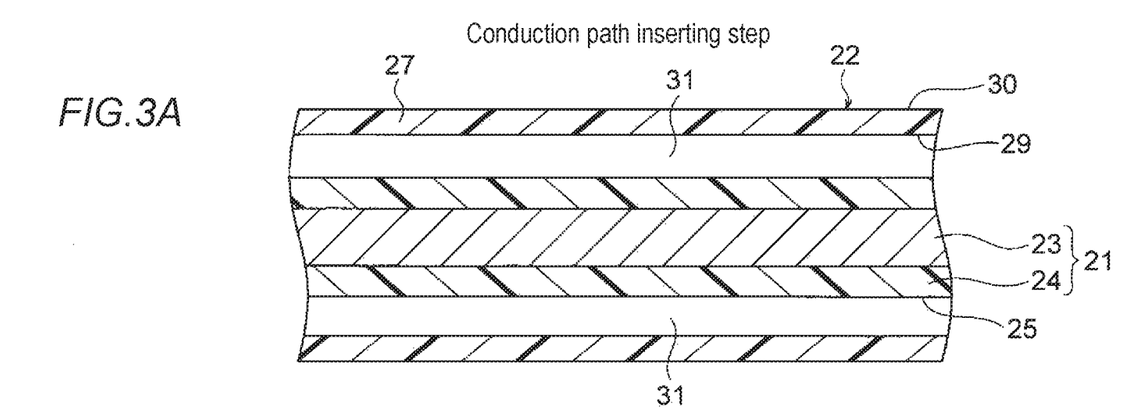
FIG. 3A is a partially enlarged view of the C part of FIG. 2C.
Figure 3B:
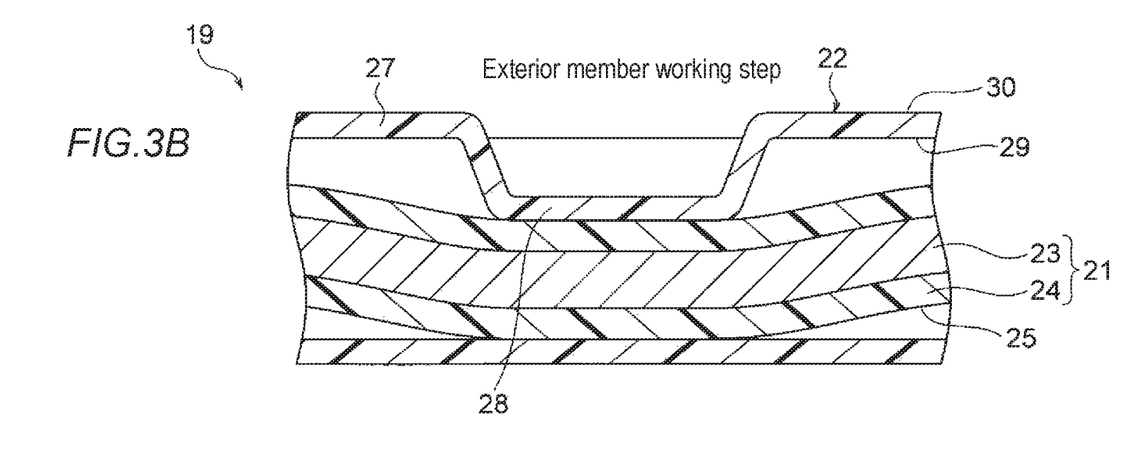
FIG. 3B is a partially enlarged view of the D part of FIG. 2E (embodiment 1).

Description is given below of an embodiment 1 with reference to the drawings. FIGS. 1A and 1B show a wire harness manufactured by a manufacturing method according to the invention: specifically, FIG. 1A is a schematic view of the arranged state of a high voltage wire harness; and, FIG. 1B is a schematic view of the arranged state of a low voltage wire harness different from one of FIG. 1A. FIGS. 2A to 2E, and 3A and 3B are explanatory views of a wire harness manufacturing method according to the invention: specifically, FIG. 2A is a perspective view of an exterior member, FIG. 2B is a view of a conduction path inserting step, FIG. 2C is a section view taken along the A-A arrow line of FIG. 2B, FIG. 2D is a view of an exterior member working step, and FIG. 2E is a section view taken along the B-B arrow line of FIG. 2D; and, FIG. 3A is a partially enlarged view of the C part of FIG. 2C, and FIG. 3B is a partially enlarged view of the D part of FIG. 2E.

In this embodiment, the invention is applied to a wire harness which is arranged in a hybrid car (which may also be an electric car or a general car structured to run on an engine).

<Structure of Hybrid Car 1>

In FIG. 1A, reference numeral 1 designates a hybrid car. The hybrid car 1 is a vehicle which is driven by mixing two kinds of power from an engine 2 and a motor unit 3, while power from a battery 5 (battery pack) is supplied to the motor unit 3 through an inverter unit 4. The engine 2, motor unit 3 and inverter unit 4 are mounted in an engine room 6 where front wheels and so on are disposed in this embodiment. Also, the battery 5 is mounted in a car rear part 7 where rear wheels and so on are disposed (it may also be mounted in a car cabin existing behind the engine room 6).

The motor unit 3 and inverter unit 4 are connected together by a high voltage wire harness 8 (a motor cable for high voltage). The battery 5 and inverter unit 4 are also connected together by a high voltage wire harness 9. The intermediate part 10 of the wire harness 9 is arranged in the vehicle under-floor 11 of a vehicle (vehicle body). Also, the intermediate part 10 is arranged along the vehicle under-floor 11 substantially in parallel thereto. The vehicle under-floor 11 is a known body (vehicle body) and is constituted of a so called panel member, while it has a through hole formed in a specified position thereof. The wire harness 9 is watertight inserted through the through hole.

The wire harness 9 and battery 5 are connected together through a junction block 12 provided in the battery 5. To the junction block 12, there is electrically connected an external connection device such as a shield connector 14 provided in a rear end side harness terminal 13 of the wire harness 9. Also, the wire harness 9 and inverter unit 4 are electrically connected together through an external connection device such as a shield connector 14 provided in a front end side harness terminal 13 of the wire harness 9.

The motor unit 3 includes a motor and a generator. Also, the inverter unit 4 includes an inverter and a converter. The motor unit 3 is formed as a motor assembly including a shield case. The inverter unit 4 is also formed as an inverter assembly including a shield case. The battery 5 is produced by modulizing a Ni-MH based material or a Li-ion based material. Here, a power storage device such as a capacitor can also be used. The battery 5 is not limited to any specified one so long as it can be used in the hybrid car 1 or an electric car.

In FIG. 1B, reference numeral 15 designates a wire harness. The wire harness 15 is one for a low pressure (for a low voltage) and is provided in order to connect electrically a low voltage battery 16 disposed in the car rear part 17 of the hybrid car 1 to an auxiliary device 18 (equipment) to be mounted in the car rear part 7. The wire harness 15, similarly to the wire harness 9 of FIG. 1A, is arranged through the vehicle under-floor 11 (this is an example and it may also be arranged through the cabin side).

As shown in FIGS. 1A and 1B, in the hybrid car 1, there are arranged the wire harnesses 8, 9 for a high voltage and the wire harness 15 for a low voltage. Although the invention can be applied to both types of wire harnesses, as a typical example, the low-voltage wire harness 15 is described below. Firstly, description is given of the structure of the wire harness 15.

<Structure of Wire Harness 15>

In FIG. 1B, the long wire harness 15 to be arranged through the vehicle under-floor 11 includes a harness main body and two connectors 20 (external connection devices) respectively to be arranged in the two ends of the harness main body 19. The wire harness 15 further includes a fixing member (for example, a clamp) for arranging the wire harness 15 in a specified position, and a water stop member (for example, a grommet) (not shown).

<Structure of Harness Main Body 19>

Figure 4A:
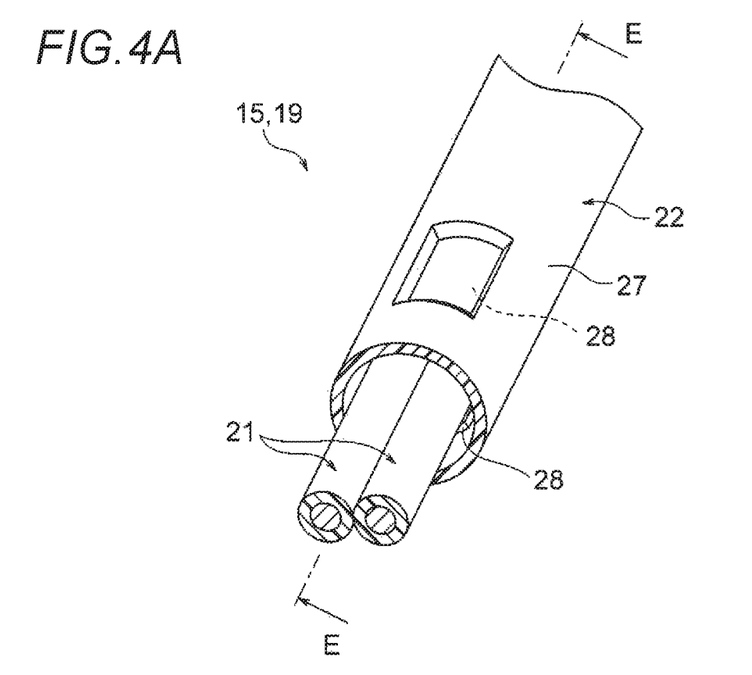
FIG. 4A is a perspective view of the structure thereof.

In FIGS. 2D and 2E, the harness main body 19 includes a conduction path 21 and an exterior member 22 for storing and protecting the conduction path 21. Here, with respect to the number of conduction paths 21, in FIGS. 2A to 2E, there is shown one conduction path but this is just an example. That is, as shown in FIG. 4A, the number thereof may also be two (multiple). Also, as the exterior member 22, there may also be employed an exterior member capable of storing and protecting the high-voltage wire harness 9 together with the wire harness 15. Firstly, description is given of the conduction path 21 in the harness main body 19 and, next, of the exterior member 22.

<Conduction Path 21>

In FIGS. 2 and 3, the conduction path 21 includes a conductive conductor 23 and an insulating insulator 24 for covering the conductor 23. The conductor 23 is formed of copper or copper alloy, or aluminum or aluminum alloy, while it has a circular part. The conductor 23 may have a conductor structure in which strands are twisted together or a conductor structure in which a rod-shaped conductor has a rectangular or circular (round) part (for example, a conductor structure in which a conductor has a straight angle single core or a round single core; in this case, an electric wire itself provides a rod-shaped wire). On the outer surface of the above-structured conductor 23, there is extrusion molded the insulator 24 made of insulating resin material.

The insulator 24 is extrusion molded on the outer peripheral surface of the conductor 23 using thermoplastic resin material. The insulator 24 is formed as a cover having a circular part and having a specified thickness. As the thermoplastic resin material, various kinds of known material can be used, and the material is properly selected from polymer materials, for example, polyvinyl chloride resin, polyethylene resin and polypropylene resin. Here, reference numeral 25 designates the outer peripheral surface of the conduction path 21 (here, it corresponds to the outer peripheral surface of the insulator 24).

<Exterior Member 22 According to this Invention>

In FIGS. 2 and 3, the exterior member 22 is formed by resin molding as a single straight tubular body (it is straight before use). Also, the exterior member 22 is formed into a shape with its body not cut (in other words, a shape with no slit (a shape which is not the shape of a split tube)). Further, the exterior member 22 is formed to have a circular part (in this embodiment, the part has a perfect circle shape but this is an example, for example, the section may also have an oblong shape, an oval shape or a rectangular shape).

The exterior member 22 includes a flexible tube part 26 and a straight tube part 27 serving as a part where the conduction path 21 is arranged straight. The flexible tube part 26 and straight tube part 27 are formed in multiple numbers, respectively. Also, they are arranged alternately. Here, the exterior member 22 may also be constituted of only the flexible tube part 26 or only the straight tube part 27. The form of the exterior member 22 is not limited particularly so long as a vibration suppressing part 28 (to be discussed later) can be formed.

<Flexible Tube Part 26>

In FIGS. 2A to 2E, the flexible tube part 26 is arranged to the shape of its mounting part of a vehicle (the shape of the wire harness arranging part of the vehicle; the shape of its fixing part of the vehicle). Also, the flexible tube part 26 is formed to have a length matched to its mounting part of the vehicle. The length of the flexible tube part 26 is not fixed but is set on a necessary length according to the shape of its mounting part of the vehicle. The flexible tube part 26 is formed in a part which can be flexed at desired angles accordingly as the wire harness 15 is packaged or transported and is routed to a vehicle. That is, the flexible tube part 26 is formed in a part which can be flexed into a bent shape and also can be naturally returned to its original straight state as shown in FIGS. 2A to 2E (the state when it is resin molded).

The flexible tube part 26, in this embodiment, is formed in a bellows tube shape (the shape is not particularly limited so long as it has flexibility). Specifically, it includes a bellows concave part and a bellows convex part which are respectively extend in the peripheral direction and are arranged to continue alternately with each other in the tube axial direction.

<Straight Tube Part 27>

In FIGS. 2 and 3, the straight tube part 27 is formed as a part which has not such flexibility as the flexible tube part 26 has. Also, the straight tube part 27 is also formed as a part which does not bend when the wire harness 15 is packaged or transported and is routed to a vehicle ("a part which does not bend" means a part which does not have positive flexibility). The straight tube part 27, in the drawings, is formed as a long straight tube.

The straight tube part 27 is formed in a rigid part when compared with the flexible tube part 26. The straight tube part 27 is formed in such position and length of the exterior member 22 as are matched to the shape of its mounting part of the vehicle. The straight tube part 27, in this embodiment, is formed as a part to be disposed at least in the vehicle under-floor 11 (see FIGS. 1A and 1B). In a partial range or in an entire range of the straight tube part 27, there are integrally therewith multiple vibration suppressing parts 28 which are the characteristic part of the invention.

<Multiple Vibration Suppressing Parts 28 which are the Characteristic Part of the Invention>

In FIGS. 2 and 3, the vibration suppressing part 28 is formed as a part which reduces the play rate of the conduction path 21 of the exterior member 22 (straight tube part 27) and suppresses the vibration of the conduction path 21. The vibration suppressing part 28 is formed in a convex-shaped part which projects inward of the straight tube part 27 when viewed from the tube inner surface 29 side of the straight tube part 27. It is formed also in a concave-shaped part when viewed from the tube outer surface 30 side of the straight tube part 27. In this embodiment, the vibration suppressing part 28 is formed in such a manner that the top portion thereof when viewed from the tube inner surface 29 side (the bottom portion thereof when viewed from the tube outer surface 30 side) has a rectangular shape in its plan view (this shape is just an example).

The vibration suppressing part 28 is formed in such a manner that the above-mentioned top portion comes into contact with the outer peripheral surface 25 of the conduction path 21 (the outer peripheral surface of the insulator 24) and holds the conduction path 21 between the tube inner surface 29 and itself (this is a preferred state of formation). In other words, it is formed to hold the conduction path 21 with no clearance. Here, when a slight clearance occurs, such clearance is allowable. The vibration suppressing parts 28 are alternately arranged in a zigzag manner along the tube axial direction of the exterior member 22 (the same direction as the extending direction of the exterior member 22 in FIGS. 2A to 2E) (the zigzag arrangement shown in FIG. 2E is not limitative but scattered arrangement in a spiral direction around the tube axis may also be employed; or, linear arrangement at specific intervals may also be employed). The above vibration suppressing parts 28 are formed by post-working (which is discussed later).

In this embodiment, the straight tube part 27 includes the multiple vibration suppressing parts 28. However, this is not limitative but the flexible tube part 26 may also include such vibration suppressing parts, or only the flexible tube part 26 may include them. Also, the number of vibration suppressing parts 28 is not limited but a single vibration suppressing part may be used so long as it can suppress vibrations. Also, the shape of the vibration suppressing part 28 is not limited to that of this embodiment or that of an embodiment 3 to be discussed later, for example, it may also be a groove-like shape which extends in a substantially arc manner in the tube inner peripheral direction.

<Wire Harness 15 Manufacturing Method of the Invention>

Next, description is given of the wire harness 15 manufacturing method (the harness main body 19 manufacturing method) with reference to the above-mentioned structure. The invention employs a manufacturing method including the following steps, that is, a preparing step, a conduction path inserting step and an exterior member working step which are performed in this order.

<Preparing Step>

In the preparing step shown in FIG. 2A, the exterior member 22 is formed by resin molding. In this case, the exterior member 22 is formed in a single straight tube shape. Also, the exterior member 22 is formed such that the flexible tube part 26 and straight tube part 27 respectively have their specific thicknesses. Further, the exterior member 22 is formed such that the tube outer surface 30 and tube inner surface 29 of the straight tube part 27 respectively have shapes with no uneven portions included. Further, in the preparing step, there is also formed the conduction path 21 having a length necessary for arrangement.

<Conduction Path Inserting Step>

In the conduction path inserting step shown in FIGS. 2B, 2C and 3A, the conduction path 21 is inserted from one end of the long exterior member 22 toward the other end. In this case, since the tube outer surface 30 and tube inner surface 29 of the straight tube part 27 respectively have shapes with no uneven portions included, the insertion of the conduction path 21 is performed very smoothly (even when the exterior member 22 is long, the insertion can be performed smoothly). This is because there exists a clearance 31 necessary and sufficient for insertion. Here, smooth insertion of the conduction path 21 can, of course, prevent wear of the outer peripheral surface 25 of the conduction path 21 (the outer peripheral surface of the insulator 24).

<Exterior Member Working Step>

In the exterior member working step shown in FIGS. 2D, 2E and 3B, post-working is performed on the multiple parts of the exterior member 22. Specifically, the exterior member 22 with the conduction path 21 inserted therein is set first on a device (such as a mold) (not shown) and, next, multiple vibration suppressing parts 28 are formed in the straight tube part 27. In forming the vibration suppressing parts 28, since the exterior member 22 is a resin molded product, there is employed a mold (not shown; here, a rectangular convex-shaped mold is employed) which is heated so as to exceed heatproof temperature. When the heated mold is pressed against the resin material from the tube outer surface 30 side, the resin material is softened, thereby forming parts each having a convex shape when viewed from the tube inner surface 29. That is, the vibration suppressing parts 28 are formed. Here, when the exterior member 22 is softened temporarily due to the pressing of the heated mold, advantageously, the internal distortion thereof is eliminated, thereby increasing the strength thereof thereafter.

When formation of the vibration suppressing parts 28 is completed, the conduction path 21 is sandwiched between the above-mentioned top portions of the vibration suppressing parts 28 and tube inner surface 29. Also, on completion of formation of the vibration suppressing parts 28, the play rate of the conduction path 21 is reduced in this forming portions (the clearance 31 is eliminated; the conduction path 21 is prevented from playing).

In this embodiment, as shown in FIG. 2E, since the vibration suppressing parts 28 are alternately arranged in a zigzag manner along the tube axial direction of the exterior member 22, on completion of formation of the vibration suppressing parts 28, the conduction path 21 is held in a meandering state. This completes the manufacture of the harness main body 19 and the conduction path 21 is suppressed against vibration relative to the exterior member 22.

Effects of the Invention

As has been described heretofore with reference to FIGS. 1 to 3, according to the wire harness 15 manufacturing method of the invention, employment of the method for inserting the conduction path 21 into the exterior member 22 prior to working of the exterior member 22 can smoothly perform the insertion of the conduction path 21. Also, due to employment of the method for working the exterior member 22 after insertion of the conduction path 21 to thereby form the vibration suppressing parts 28, for example, by forming the vibration suppressing parts 28 in portions where the conduction path 21 is easy to vibrate, the plate rate of the conduction path 21 in such forming portions can be reduced. This can suppress relative vibration between the conduction path 21 and exterior member 22.

Therefore, according to the wire harness 15 manufacturing method of the invention, advantageously, while paying attention to workability concerning the insertion of the conduction path 21, the vibration of the conduction path 21 within the exterior member 22 can be suppressed. Also, according to the wire harness 15 of the invention, advantageously, the wear, damage and so on of the outer peripheral surface 25 of the conduction path 21 can be prevented.

Also, according to the wire harness 15 manufacturing method of the invention, since, for suppressing the movement of the conduction path 21, the multiple vibration suppressing parts 28 are alternately arranged in a zigzag manner (or, are arranged in a scattered manner in the spiral direction), for example, in comparison with an embodiment 2 to be discussed later, even when the exterior member 22 receives an external force in the arrow direction shown in FIGS. 4A and 4B, it will not be easily bent nor broken (this does not deny the embodiment 2 but the embodiment 2 is sufficiently effective. Here, no bending can, of course, enhance workability in the conduction path inserting step). That is, this embodiment provides an effect that the lowered rigidity of the exterior member 22 can be prevented.

Embodiment 2

Description is given below of an embodiment 2 with reference to the drawings. FIGS. 4A and 4B are views of a second embodiment of a wire harness manufactured according to the manufacturing method of the invention. That is, FIG. 4A is a perspective view of the structure of the wire harness, and FIG. 4B is a section view taken along the E-E arrow line of FIG. 4A. Here, the composing members of this embodiment, which are basically the same as those of the embodiment 1, are given the same designations and thus the detailed description thereof is omitted.

<Structure of Wire Harness 15>

Figure 4B:
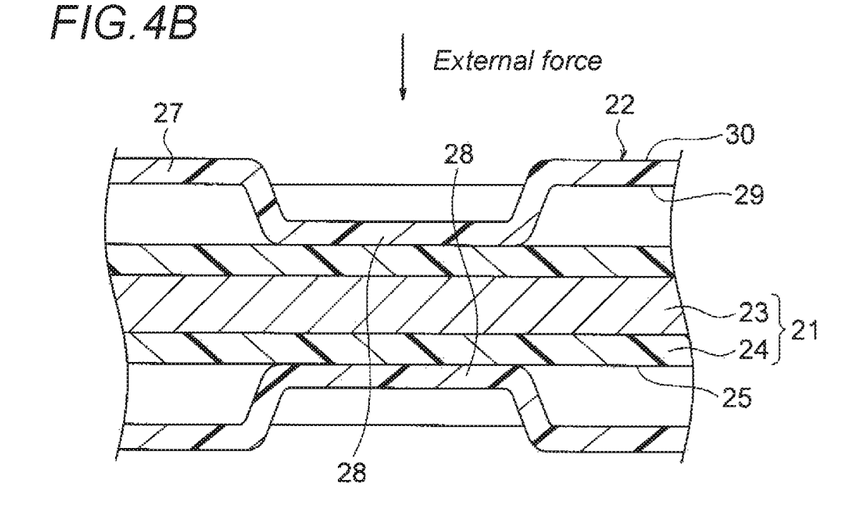
FIG. 4B is a section view taken along the E-E arrow line of FIG. 4A (embodiment 2).

In FIGS. 4A and 4B, a harness main body 19 constituting a long wire harness 15 includes two conduction paths 21 and an exterior member 22 for storing and protecting the two conduction paths 21. In the exterior member 22, there are formed multiple vibration suppressing parts 28 which are the characteristic part of the invention (they are formed in the same method as the embodiment 1). The vibration suppressing parts 28, in this embodiment, are formed as a pair of upper and lower vibration suppressing parts. Also, they are formed side by side linearly at a specific interval. Since the vibration suppressing parts 28 of the embodiment 2 are the paired upper and lower vibration suppressing parts, they are formed in such convex-shaped portions (shallow-bottom concave-shaped portions) as are lower than those of the embodiment 1.

<Effects of Embodiment 2>

The embodiment 2, of course, provides similar effects to the embodiment 1. That is, while paying attention to workability concerning the insertion of the conduction paths 21, the vibrations of the conduction paths 21 within the exterior member 22 can be suppressed. Also, the wear, damage and so on of the outer peripheral surfaces 25 of the conduction paths 21 can be prevented.

Embodiment 3

Figure 5A:
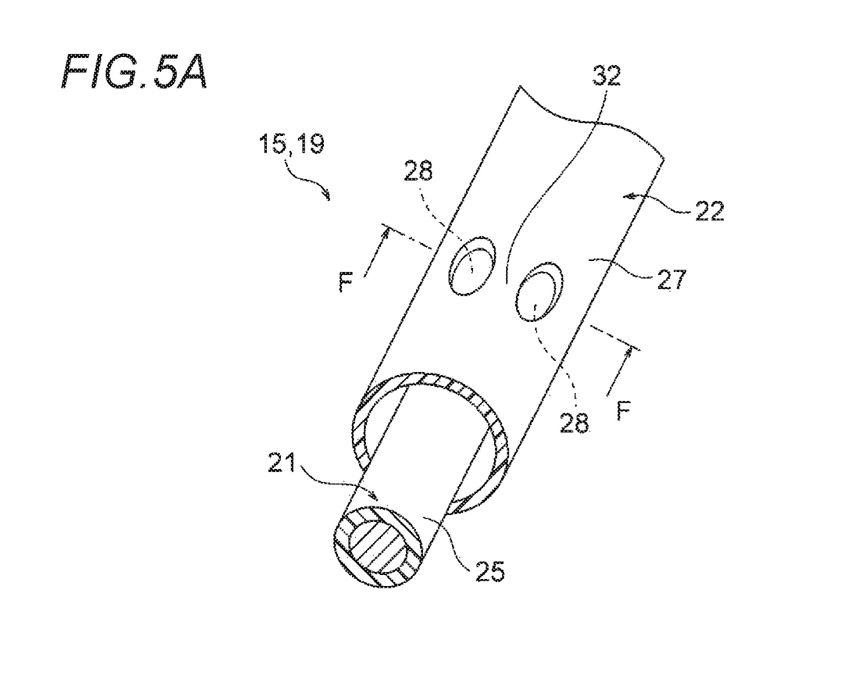
FIG. 5A is a perspective view of the structure thereof.
Figure 5B:
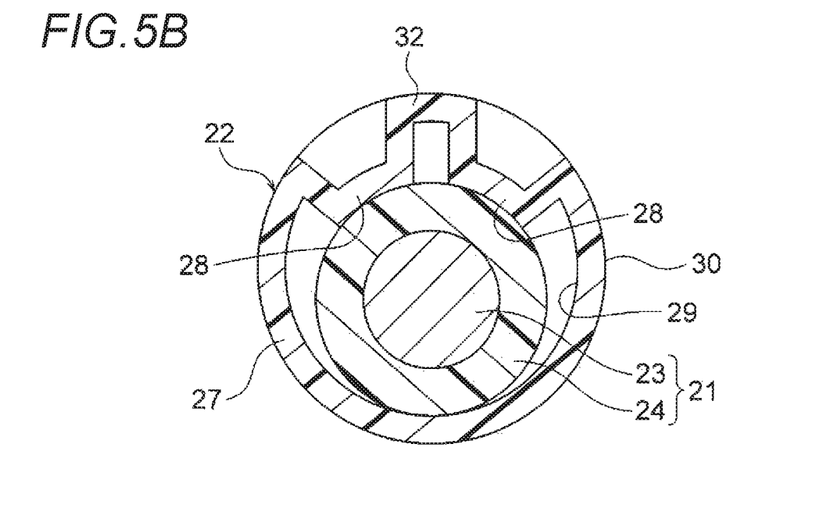
FIG. 5B is a section view taken along the F-F arrow line of FIG. 5A (embodiment 3).

Description is given below of an embodiment 3 with reference to the drawings. FIGS. 5A and 5B show a wire harness according to a third embodiment manufactured by the manufacturing method of the invention. That is, FIG. 5A is a perspective view of the structure of the wire harness and FIG. 5B is a section view taken along the F-F arrow line of FIG. 5A. Here, the composing members of this embodiment, which are basically the same as those of the embodiment 1, are given the same designations and thus the detailed description thereof is omitted.

<Structure of Wire Harness 15>

In FIGS. 5A and 5B, a harness main body 19 constituting a long wire harness 15 includes a conduction path 21 and an exterior member 22 for storing and protecting the conduction path 21. The exterior member 22 includes multiple vibration suppressing parts 28 (which are formed in the same method as the embodiment 1) that provide the characteristic part of the invention. The vibration suppressing parts 28 of the embodiment 3 are formed to have a reinforcing rib 32 between them. The reinforcing rib 32 has a shape extending in the tube axial direction and is used to increase the rigidity of the exterior member 22. In the embodiment 3, since the reinforcing rib 32 has such shape as shown in FIGS. 5A and 5B, the vibration suppressing parts 28 are formed in two convex-shaped portions each having a circular shape (an oval shape) in its plan view.

<Effects of Embodiment 3>

The embodiment 3, of course, provides similar effects to the embodiment 1. That is, while paying attention to workability concerning the insertion of the conduction path 21, the vibration of the conduction path 21 within the exterior member 22 can be suppressed; and, the wear, damage and so on of the outer peripheral surfaces 25 of the conduction path 21 can be prevented. Also, in the embodiment 3, due to provision of the reinforcing rib 32, there is also provided an effect that the rigidity of the exterior member 22 can be secured sufficiently.

Embodiment 4

Figure 6A:
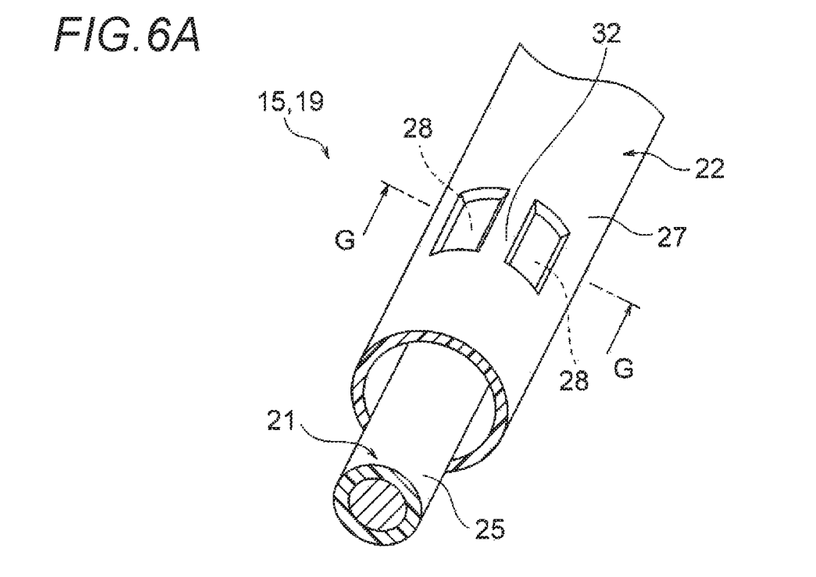
FIG. 6A is a perspective view of the structure thereof.
Figure 6B:
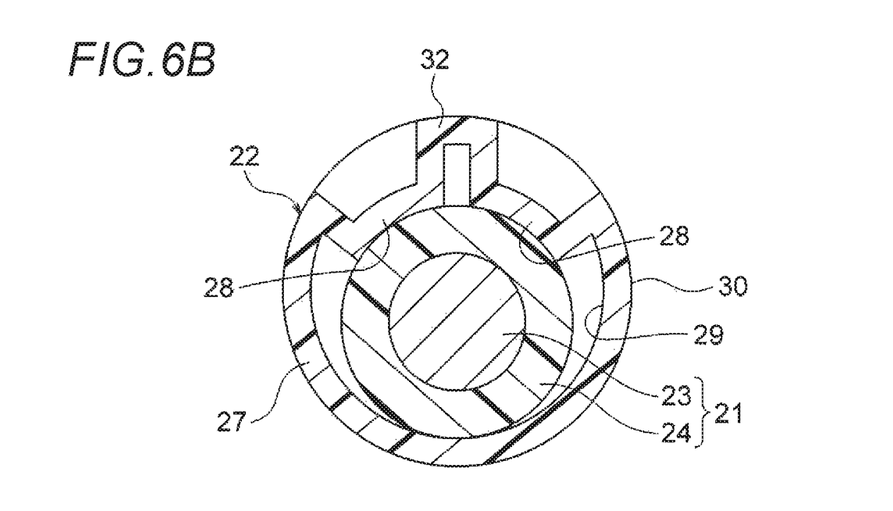
FIG. 6B is a section view taken along the G-G arrow line of FIG. 6A (embodiment 4).

Description is given below of an embodiment 4 with reference to the drawings. FIGS. 6A and 6B show a wire harness according to a fourth embodiment manufactured by the manufacturing method of the invention. That is, FIG. 6A is a perspective view of the structure of the wire harness and FIG. 6B is a section view taken along the G-G arrow line of FIG. 6A. Here, the composing members of this embodiment, which are basically the same as those of the embodiment 1, are given the same designations and thus the detailed description thereof is omitted.

<Structure of Wire Harness 15>

In FIGS. 6A and 6B, a harness main body 19 constituting a long wire harness 15 includes a conduction path 21 and an exterior member 22 for storing and protecting the conduction path 21. The exterior member 22 includes multiple vibration suppressing parts 28 (which are formed in the same method as the embodiment 1) that provide the characteristic part of the invention. The vibration suppressing parts 28 of the embodiment 4 are formed to have a reinforcing rib 32 between them. The reinforcing rib 32 has a shape extending in the tube axial direction and is used to increase the rigidity of the exterior member 22. In the embodiment 4, since the reinforcing rib 32 has such shape as shown in FIGS. 6A and 6B, the vibration suppressing parts 28 are formed in two convex-shaped portions each having a rectangular shape in its plan view. The embodiment 4, when compared with the embodiment 3, increases the contact area with respect to the outer peripheral surface of the conduction path 21, thereby providing an advantage that the holding state of the conduction path 21 can be stabilized further.

<Effects of Embodiment 4>

The embodiment 4, of course, provides similar effects to the embodiment 1. That is, while paying attention to workability concerning the insertion of the conduction path 21, the vibration of the conduction path 21 within the exterior member 22 can be suppressed; and, the wear, damage and so on of the outer peripheral surfaces 25 of the conduction path 21 can be prevented. In the embodiment 4, due to provision of the reinforcing rib 32, there is also provided an effect that the rigidity of the exterior member 22 can be secured sufficiently.

Further, of course, the invention can be modified in various ways without changing the subject matter of the invention.

DESCRIPTION OF REFERENCE NUMERALS

1: Hybrid car
2: Engine
3: Motor unit
4: Inverter unit
5: Battery
6: Engine room
7: Car rear part
8, 9: Wire harness
10: Intermediate part
11: Vehicle under-floor
12: Junction block
13: Harness terminal
14: Shield connector
15: Wire harness
16: Low voltage battery
17: Car front part
18: Auxiliary device
19: Harness main body
20: Connector
21: Conduction path
22: Exterior member
23: Conductor
24: Insulator
25: Outer peripheral surface
26: Flexible tube part
27: Straight tube part
28: Vibration suppressing part
29: Tube inner surface
30: Tube outer surface
31: Clearance
32: Reinforcing rib

What is claimed is:

1. A wire harness manufacturing method comprising:
a conduction path inserting step of inserting one or a plurality of conduction paths from one end of a resin-made tubular exterior member to the other end thereof; and
an exterior member working step of performing post-working on one or a plurality of parts of the exterior member, after the conduction path inserting step,
wherein the exterior member working step includes forming a convex-shaped part which projects into an interior of the exterior member with projecting walls extending toward the one or plurality of conduction paths when viewed from an inner surface side of the exterior member by performing the post-working using a heated mold pressed against an outer surface side of the exterior member, and
wherein the convex-shaped part is a vibration suppressing part to reduce a play rate of the one or plurality of conduction paths in the exterior member and suppress a vibration of the one or a plurality of conduction paths.

2. The wire harness manufacturing method according to claim 1,
wherein the forming the convex-shaped part includes forming and arranging a plurality of the convex-shaped parts which are vibration suppressing parts, alternately in a zigzag manner along a tube axial direction of the exterior member, or, in a scattering manner in a spiral direction around a tube axis of the exterior member.

3. The wire harness manufacturing method according to claim 2,
wherein the forming the convex-shaped part includes forming a reinforcing rib extending in the tube axial direction of the exterior member.

4. The wire harness manufacturing method according to claim 3,
wherein the reinforcing rib extends through the convex-shaped part to split the convex-shaped part in two.

5. The wire harness manufacturing method according to claim 1,
wherein the forming the convex-shaped part includes forming a reinforcing rib extending in the tube axial direction of the exterior member.

6. The wire harness manufacturing method according to claim 5,
wherein the reinforcing rib extends through the convex-shaped part to split the convex-shaped part in two.

7. The wire harness manufacturing method according to claim 1,
wherein the convex-shaped part is formed such that an inner surface thereof comes into contact with an outer peripheral surface of the one or plurality of conduction paths and holds the one or plurality of conduction paths between itself and an opposing inner surface of the exterior member.

8. The wire harness manufacturing method according to claim 1,
wherein the convex-shaped part is formed to contour to a shape of an outer peripheral surface of the one or plurality of conduction paths.

* * * * *